United States Patent
Hosogoe et al.

(10) Patent No.: US 6,766,961 B2
(45) Date of Patent: Jul. 27, 2004

(54) IC CARD

(75) Inventors: Takashi Hosogoe, Kawasaki (JP); Yoshii Hyodo, Chiyoda-ku (JP); Yasumasa Yamate, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/331,118

(22) Filed: Dec. 30, 2002

(65) Prior Publication Data

US 2003/0151125 A1 Aug. 14, 2003

Related U.S. Application Data

(63) Continuation of application No. PCT/JP00/04580, filed on Jul. 7, 2000.

(51) Int. Cl.[7] ............................................. G06K 19/06
(52) U.S. Cl. ..................... 235/492; 235/487; 235/451; 235/375; 235/379; 235/380
(58) Field of Search .................... 235/492, 487, 235/451, 375, 379, 380; 705/65, 44

(56) References Cited

U.S. PATENT DOCUMENTS

| | | | | |
|---|---|---|---|---|
| 5,036,461 A | * | 7/1991 | Elliott et al. ................... | 705/44 |
| 5,233,658 A | * | 8/1993 | Bianco et al. ................. | 713/185 |
| 5,258,604 A | * | 11/1993 | Behrens et al. ........ | 235/462.15 |
| 5,408,082 A | * | 4/1995 | Takagi et al. ................ | 235/492 |
| 5,544,246 A | * | 8/1996 | Mandelbaum et al. ......... | 705/65 |
| 5,679,945 A | * | 10/1997 | Renner et al. ............... | 235/492 |
| 5,838,059 A | | 11/1998 | Inoue et al. | |
| 6,237,849 B1 | * | 5/2001 | Cooper et al. .............. | 235/380 |
| 6,296,191 B1 | * | 10/2001 | Hamann et al. ............. | 235/492 |
| 6,354,489 B2 | * | 3/2002 | Tanaka ......................... | 235/375 |
| 6,557,032 B1 | * | 4/2003 | Jones et al. ................. | 709/220 |
| 6,564,995 B1 | * | 5/2003 | Montgomery ............... | 235/379 |

FOREIGN PATENT DOCUMENTS

| | | |
|---|---|---|
| JP | 63-276685 | 11/1988 |
| JP | 8-22512 | 1/1996 |
| JP | 8-190614 | 7/1996 |
| JP | 9-128512 | 5/1997 |
| JP | 9-231112 | 9/1997 |
| JP | 9-293012 | 11/1997 |
| JP | 9-305734 | 11/1997 |
| JP | 10-69529 | 3/1998 |
| JP | 10-171959 | 6/1998 |
| JP | 10-284621 | 10/1998 |

* cited by examiner

*Primary Examiner*—Steven S. Paik
(74) *Attorney, Agent, or Firm*—Armstrong, Kratz, Quintos, Hanson & Brooks, LLP (57) ABSTRACT

A multi-application type IC card that can be accessed by an external terminal of a file system type IC card. There are installed, on a multi-application type IC card, emulator programs that can process commands from an external terminal for a file system type IC card. This will enable an external terminal for a file system type IC card to access a multi-application type IC card.

3 Claims, 8 Drawing Sheets

| |
|---|
| Current file position information |
| File attribute information |
| File hierarchy information |
| File address information |
| File data (EF) |

FIG. 3

| File name | Password |
|---|---|
| D F 1 | None |
| D F 2 | Z Z Z Z |
| E F 3 | X X X X |
| D F 1 – 1 | None |
| E F 1 – 2 | Y Y Y Y |
| E F 2 – 1 | None |
| E F 2 – 2 | None |
| E F 2 – 3 | None |
| E F 1 – 1 – 1 | V V V V |
| E F 1 – 1 – 2 | U U U U |

FIG. 4

| File name | Parent file name | Child file name |
|---|---|---|
| D F 1 | M F | D F 1 - 1、E F 1 - 2 |
| D F 2 | M F | E F 2 - 1、E F 2 - 2、E F 2 - 3 |
| E F 3 | M F | None |
| D F 1 - 1 | D F 1 | E F 1 - 1 - 1、E F 1 - 1 - 2 |
| E F 1 - 2 | D F 1 | None |
| E F 2 - 1 | D F 2 | None |
| E F 2 - 2 | D F 2 | None |
| E F 2 - 3 | D F 2 | None |
| E F 1 - 1 - 1 | D F 1 - 1 | None |
| E F 1 - 1 - 2 | D F 1 - 1 | None |

FIG. 5

| File name | File type | Record number | Starting address | Ending address |
|---|---|---|---|---|
| E F 3 | Binary | | 00000000 | 00010000 |
| E F 1 - 2 | Binary | | ... | ... |
| E F 2 - 1 | Record | 1 | ... | ... |
| | | 2 | ... | ... |
| | | . | ... | ... |
| E F 2 - 2 | Record | 1 | ... | ... |
| | | 2 | ... | ... |
| E F 2 - 3 | Record | 1 | ... | ... |
| | | 2 | ... | ... |
| | | . | ... | ... |
| E F 1 - 1 - 1 | Binary | | ... | ... |
| E F 1 - 1 - 2 | Binary | | ... | ... |

IC CARD

This application is a continuation of International Application PCT/JP00/04580 filed Jul 7, 2000.

BACKGROUND OF THE INVENTION

1. Field of the Invention

The present invention relates to a multi-application type IC card having a plurality of functions including credit card and electronic money functions.

2. Description of the Related Art

An IC card is a plastic card in which an LSI chip with a built-in CPU and memory (such as ROM or RAM) is embedded. Because an IC card can ensure higher security and store a greater volume of data than a conventional magnetic card, a single card can be used to implement a plurality of functions including credit card and electronic money functions. An IC card communicates with an IC card terminal (hereafter, referred to as an external terminal). Based on commands from an external terminal, the CPU within the LSI chip executes application programs (including the operating system) that are stored in memory to read and write data files that are stored in memory.

Figure 8A:
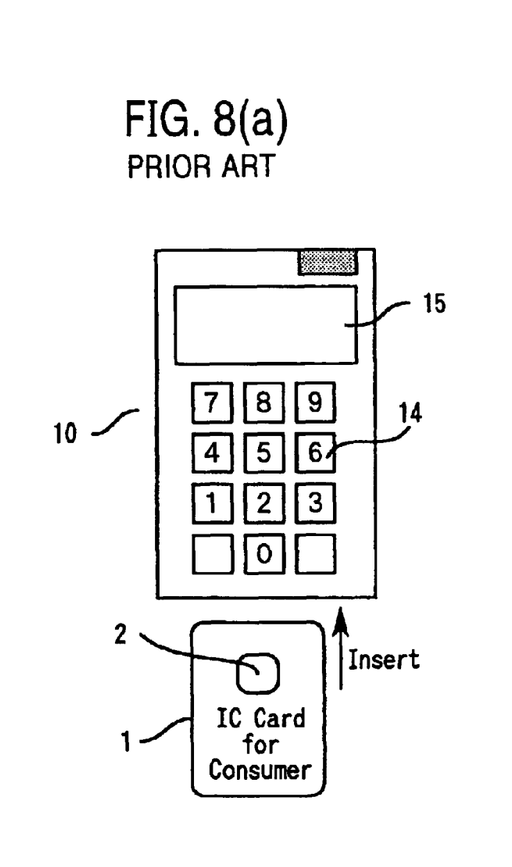
FIG. 8 is a diagram explaining an IC card terminal device (external terminal)
Figure 8B:
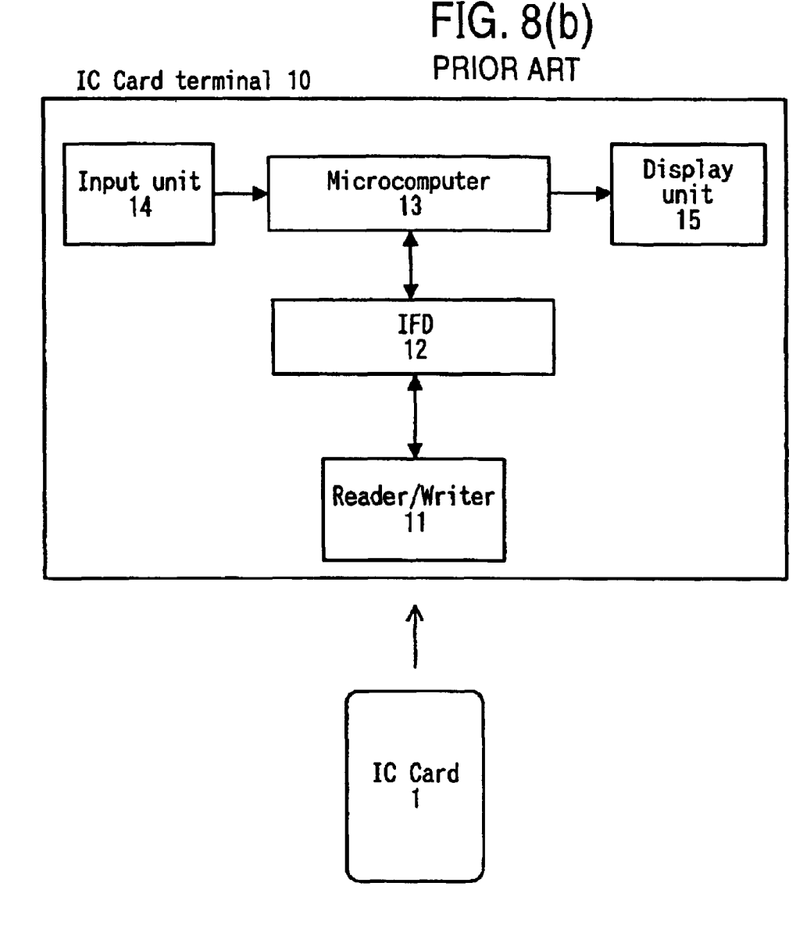

FIGS. 8(a) and 8(b) show a diagram explaining an IC card terminal (external terminal). FIG. 8(a) is an external view of the external terminal, and FIG. 8(b) is a block diagram. Multi-application type IC card 1 contains built-in LSI chip 2, which supports a plurality of functions including credit card and electronic money functions. LSI chip 2 stores application programs corresponding to each of the functions. External terminal 10, which is a handy-type terminal as shown in FIG. 8(a), for example, comprises an input unit 14 for entering information such as an amount of money or password, a display unit 15 using an LCD or other type of display, and an IC card insertion slot, which is not illustrated. In addition, external terminal 10 has a built-in reader/writer 11 for reading data from and writing data to IC card 1, an IFD (interface device) 12 for controlling communications with IC card 1, and a microcomputer 13, as shown in FIG. 8(b). Microcomputer 13 comprises memory for storing processing programs corresponding to the programs that are stored in the IC card, and a processor part (CPU) for executing these processing programs to communicate with the IC card.

Figure 9:
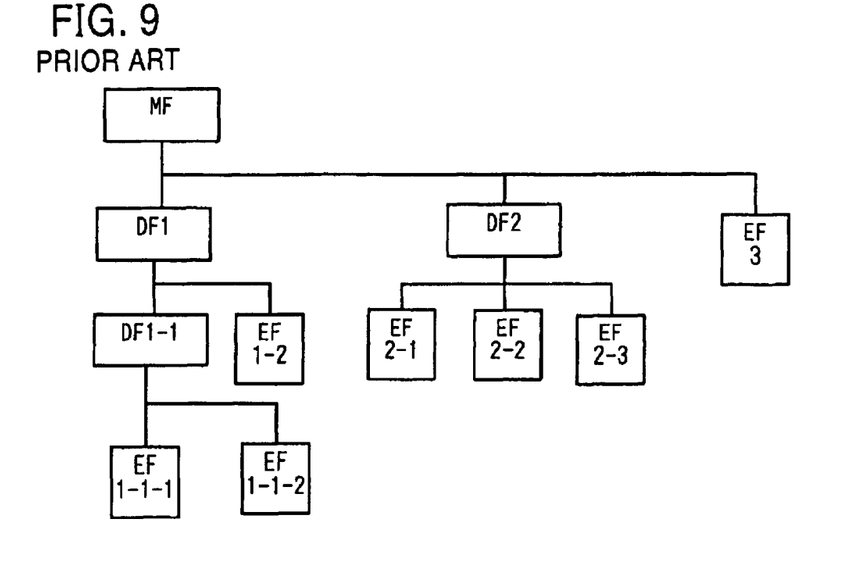
FIG. 9 is a diagram showing an example of a file structure (file system type) that is stored on an IC card.

FIG. 9 is a diagram showing an example of a file structure that is stored on an IC card. The file structure in FIG. 9 is called a file system type file structure. In FIG. 9, files are arranged in a hierarchical structure comprising an MF (master file) at the highest level with subordinate DFs (dedicated files) and/or EFs (elementary files) below it. At least one EF must be subordinate to a DF, and other separate DFs may also be subordinate. An EF is a lowest-level file in which data having a binary structure or record structure is stored.

Figure 10:
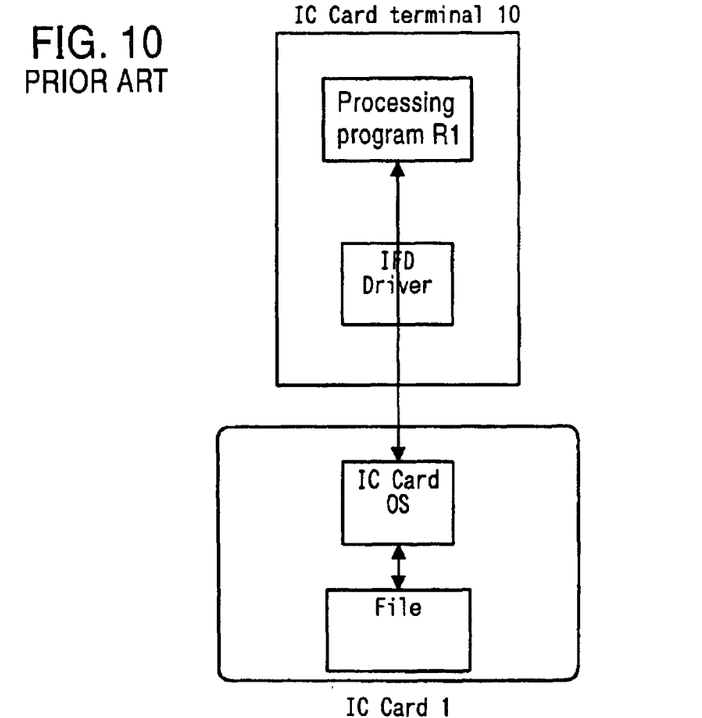
FIG. 10 is a diagram showing a configuration example for program communications between a file system type IC card and an external terminal.

FIG. 10 is a diagram showing a configuration example for program communications between a file system type IC card and an external terminal. IC card 1 contains files shown in FIG. 9 and an IC card OS (operating system). Processing program R1 of external terminal 10 communicates with the IC card OS via an IFD (interface device) driver for controlling communications with the IC card. The IC card OS processes commands from processing program R1, accesses files that are selected according to those commands, and responds to the external terminal.

For example, to read file EF1-1-1 in FIG. 9, processing program R1 of the external terminal sequentially sends the commands shown below to the IC card OS (operating system).

(1) DF1 selection command
(2) DF1-1 selection command
(3) EF1-1-1 selection command
(4) File read command The IC card OS selects file EF1-1-1 according to the commands in (1), (2), and (3) above, reads the data in selected file EF1-1-1 according to the command in (4) above, and sends that data to the external terminal.

Figure 11:
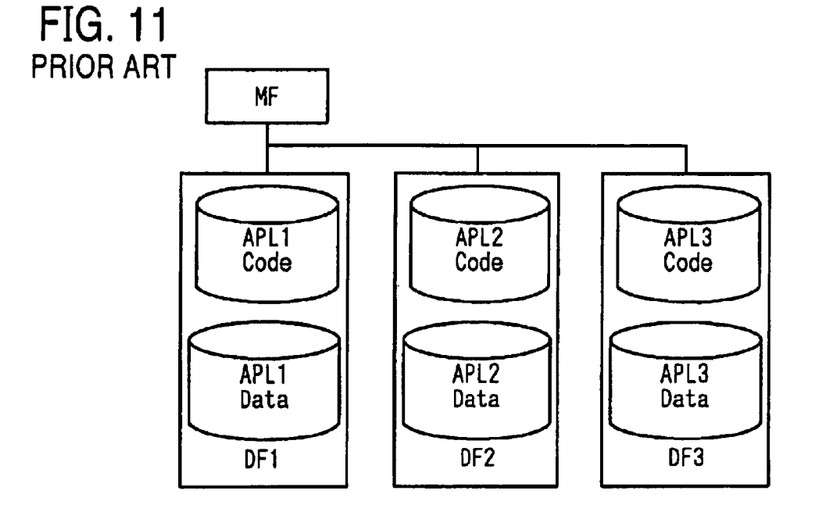
FIG. 11 is diagram showing another example of a file structure (multi-application type) that is stored on an IC card.

FIG. 11 is a diagram showing another example of a file structure that is stored on an IC card. The file structure in FIG. 11 is called a multi-application type file structure. In FIG. 11, a plurality of DFs are subordinate to an MF, and each DF contains an application program that corresponds to one of a plurality of functions of the IC card and data that corresponds to that application program. In recent years, there has been a steady migration for IC cards to this multi-application type file structure in place of the above-mentioned file system type file structure.

For example, in FIG. 11, DF1 contains application program APL1 (code and data) corresponding to function A, DF2 contains application program APL2 (code and data) corresponding to function B, and DF3 contains application program APL3 (code and data) corresponding to function C.

Figure 12:
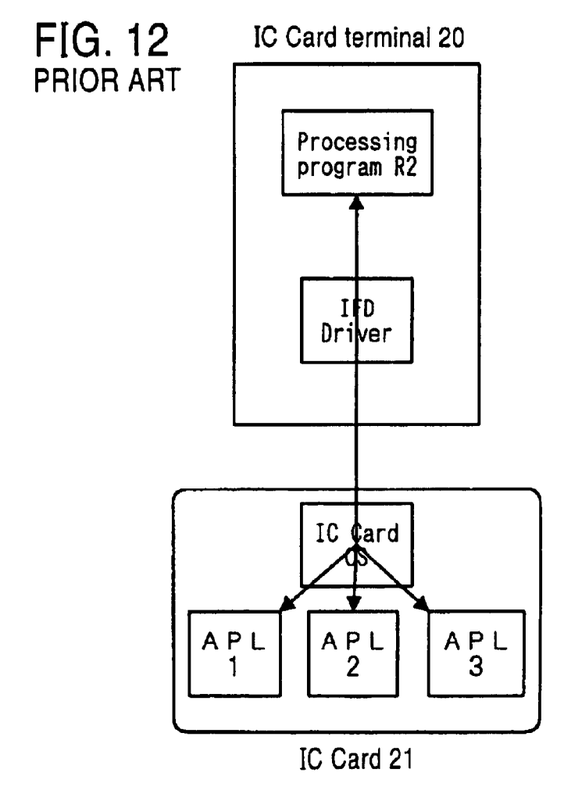
FIG. 12 is a diagram showing a configuration example for program communications between a multi-application type IC card and an external terminal.

FIG. 12 is a diagram showing a configuration example for program communications between a multi-application type IC card and an external terminal. IC card contains card-side application programs (including data) APL1, APL2, and APL3 corresponding to a plurality of functions A, B, and C, respectively, and an IC card OS (operating system). Processing program R2 of external terminal 20 communicates with each application program via an IFD (interface device) driver for controlling communications with the IC card and also via the IC card OS. Each command from processing program R2 is directed to the corresponding application program by the IC card OS and processed by that application program.

For example, processing program R2 of the external terminal first sends a command for selecting a DF, like the command in (1) above, to the IC card OS (operating system). After the IC card OS selects DF1, processing program R2 of the external terminal communicates with the application program of the selected DF1, not with the IC card OS, by using commands specific to that program. Therefore, a multi-application type IC card does not support the commands in (2) and (3) above for selecting a lower level file and the command in (4) above for reading a file, which are sent to the OS of a file system type IC card.

When a plurality of different IC card file structures like the ones described above coexist, the following problem will occur. As the use of multi-application type IC cards expands in the future, external terminals for relatively old file system type IC cards will not be able to access relatively new multi-application type IC cards. (External terminals for multi-application type IC cards certainly cannot access file system type IC cards.)

For resolving this problem, revising the processing programs of external terminals for file system type IC cards has been considered so as to be compatible with the multi-application type IC cards, however, this approach is expected to be extremely labor intensive and costly.

SUMMARY OF THE INVENTION

An object of the present invention is to enable access to an IC card having a prescribed file structure from an external terminal for an IC card having a different file structure.

A further object of the present invention is to provide a kind of multi-application type IC card that can be accessed by an external terminal of a file system type IC card.

To accomplish the abovementioned objects, there are installed, on a multi-application type IC card, emulator programs that can process commands from an external terminal for a file system type IC card. This will enable an external terminal for a file system type IC card to access a multi-application type IC card.

To accomplish the abovementioned objects, an IC card which comprises memory for storing programs corresponding to a first file structure, and a CPU for executing programs stored in the IC card memory, and communicates with a first external terminal that sends commands corresponding to the programs, the IC card being characterized in that: the programs include an emulator program for processing commands from a second external terminal that corresponds to an IC card containing files corresponding to a second file structure; and the CPU executes the emulator program so that the IC card communicates with the second external terminal.

For example, the first file structure is a structure having files that contain application programs subordinate to a master file, and the IC card having the first file structure processes commands from the first external terminal according to an application program of a file that is selected according to a selection command from the first external terminal; and the second file structure is a structure having a hierarchy of files that contain data, and the IC card having the second file structure processes commands from the second external terminal according to the operating system of the relevant IC card.

In this case, for example, the emulator program has information related to a plurality of files constituting the second file structure and to the hierarchical relationships among that plurality of files; and the emulator program confirms the hierarchical relationships of files that are sequentially selected according to selection commands from the second external terminal based on the information, and accesses a file that is being selected according to an access command from the external terminal.

DETAILED DESCRIPTION OF THE PREFERRED EMBODIMENT

An embodiment of the present invention is described below according to the figures. However, the technical scope of the present invention is not limited by the embodiment presented herein.

In an embodiment of the present invention, emulator programs for processing file access commands from an external terminal for the abovementioned file system type IC card are installed on the abovementioned multi-application type IC card. Also, an emulator program, which stores the file data that is stored on a file system type IC card as file data subordinate to the emulator program, can access prescribed data according to file access commands from an external terminal for a file system type IC card.

Figure 1A:
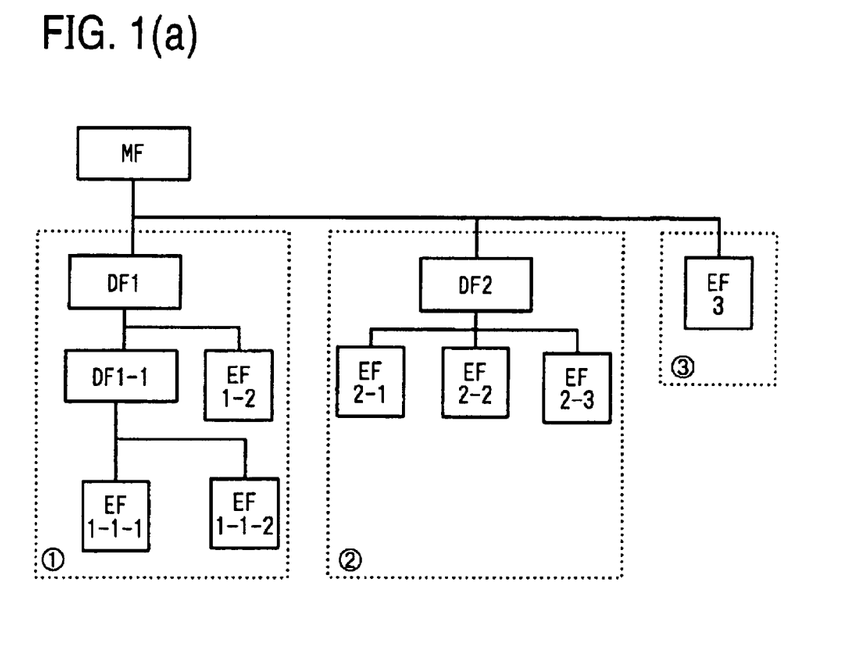
FIG. 1 is a diagram showing an example of a file system type file structure and an example of a multi-application type file structure containing emulator programs, which corresponds to this file system type file structure.
Figure 1B:
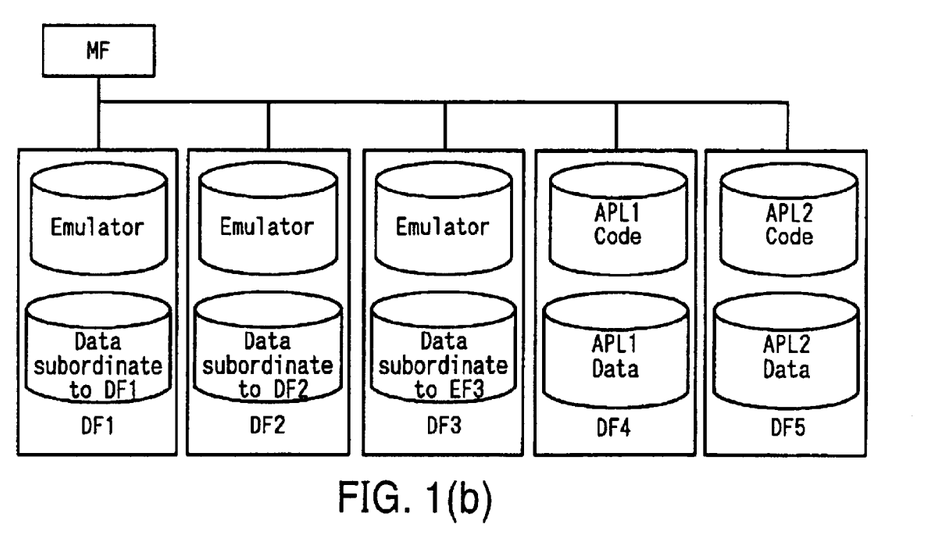

FIG. 1 is a diagram showing an example of a file system type file structure (FIG. 1 (a)) and an example of a multi-application type file structure containing emulator programs (FIG. 1 (b)), which corresponds to this file system type file structure. When DF1, DF2, and EF3 are subordinate to an MF as shown in FIG. 1 (a), the corresponding files DF1, DF2, and DF3, respectively, which have emulator programs, are created under the MF in FIG. 1 (b). Moreover, an emulator program having the file data subordinate to DF1 in FIG. 1 (a) (indicated by dotted line box (1)) is stored in file DF1 of FIG. 1 (b). Therefore, the emulator program in DF1 has file data EF1-2, EF1-1-1, and EF1-1-2. Also, an emulator program having the file data subordinate to DF2 in FIG. 1 (a) (indicated by dotted line box (2)) is stored in file DF2 of FIG. 1 (b). Therefore, the emulator program in DF2 has file data EF2-1, EF2-2, and EF2-3. Furthermore, an emulator program having the file data EF3 in FIG. 1 (a) (indicated by dotted line box (3)) is stored in file DF3 of FIG. 1 (b).

Figure 2:
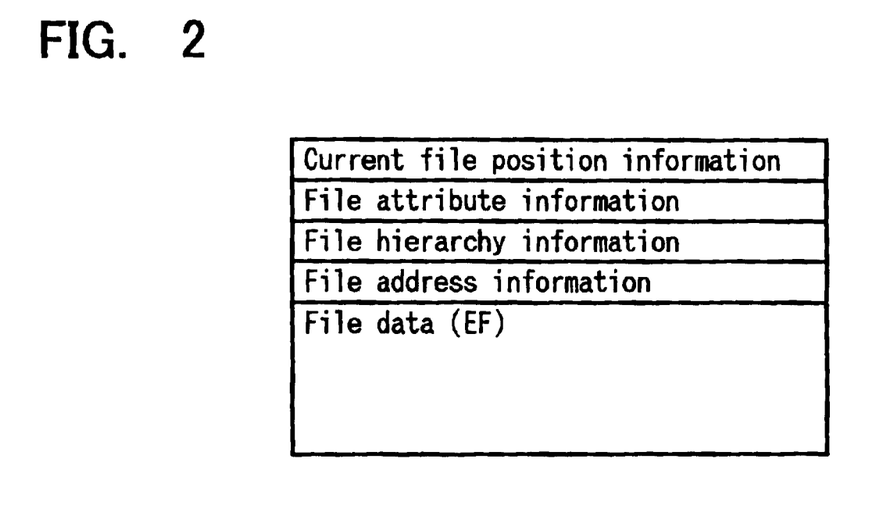
FIG. 2 is a diagram explaining the information an emulator program has.

FIG. 2 is a diagram explaining the information that the emulator programs have. In FIG. 2, the emulator programs have current file position information, file attribute information, file hierarchy information, file address information, and file data. The file data is actually an area for storing file data EF1-1-1, EF1-1-2, EF2-1, EF2-2, EF2-3, and EF3.

Figure 3:
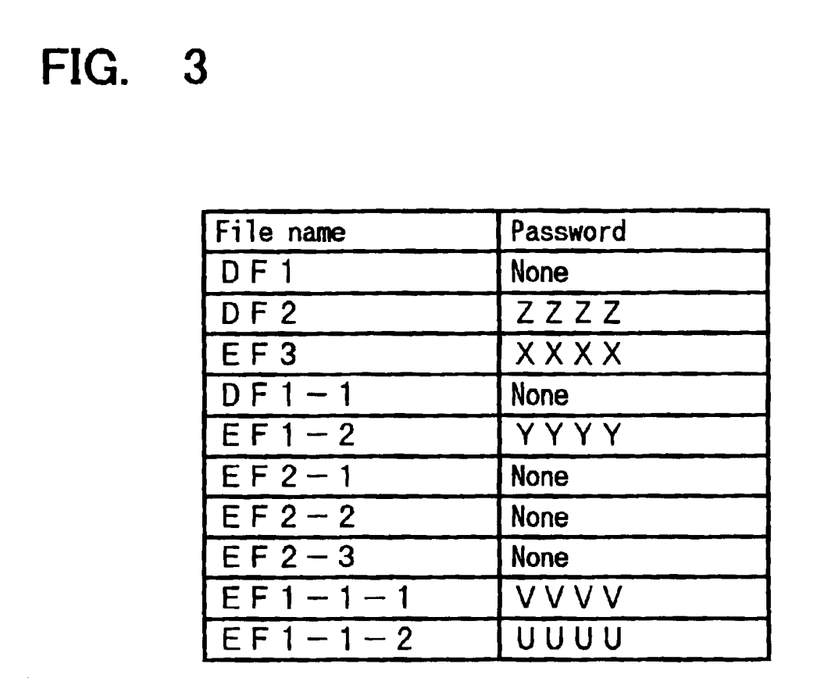
FIG. 3 is an example of a file attribute information table.

The current file position information is an area in which a file name that is specified by a file access command from an external terminal for a file system type IC card is written. The file attribute information is a password, identification code, or other information required for accessing each file. FIG. 3 is an example of a file attribute information table. As shown in FIG. 3, the table contains information indicating whether or not a password exists for accessing each DF or EF, and when a password is required, the table contains that password.

Figure 4:
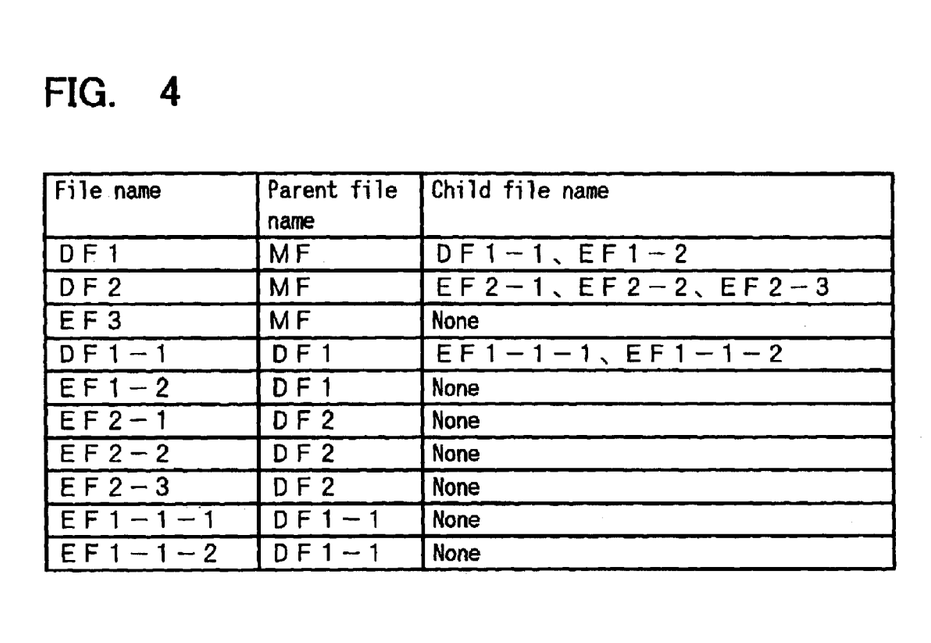
FIG. 4 is an example of a file hierarchy information table.

The file hierarchy information indicates the hierarchical relationships among the file data included with each emulator program. FIG. 4 is an example of a file hierarchy information table. As shown in FIG. 4, the table contains the name of the file directly above each file (parent file name) and the names of the files directly below each file (child file names) based on the subordinate relationships of each file in the file structure. Naturally, a lowest-level file EF has no child file.

Figure 5:
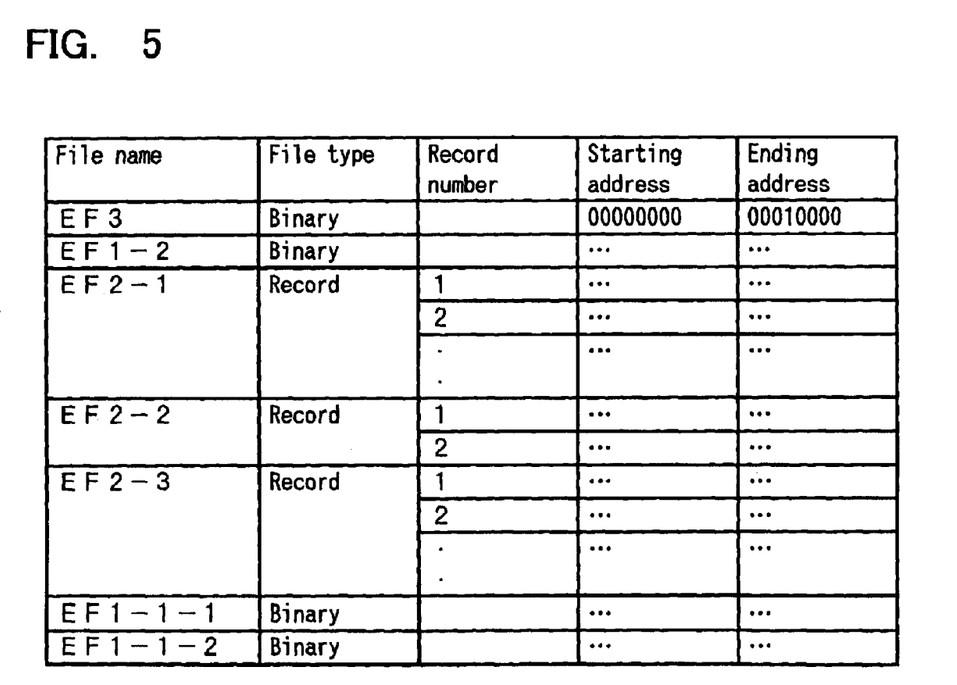
FIG. 5 is an example of a file address information table.

The addresses of each file stored in the file data are stored for the file address information. FIG. 5 is an example of a file address information table. The table has the type (binary file or record file) of each file. In addition, when the file data is a binary file, the file address information has the starting and ending addresses of each file, and when the file data is a record file, the file address information has the record numbers of the records constituting the record file and the starting and ending addresses of each record.

Figure 6:
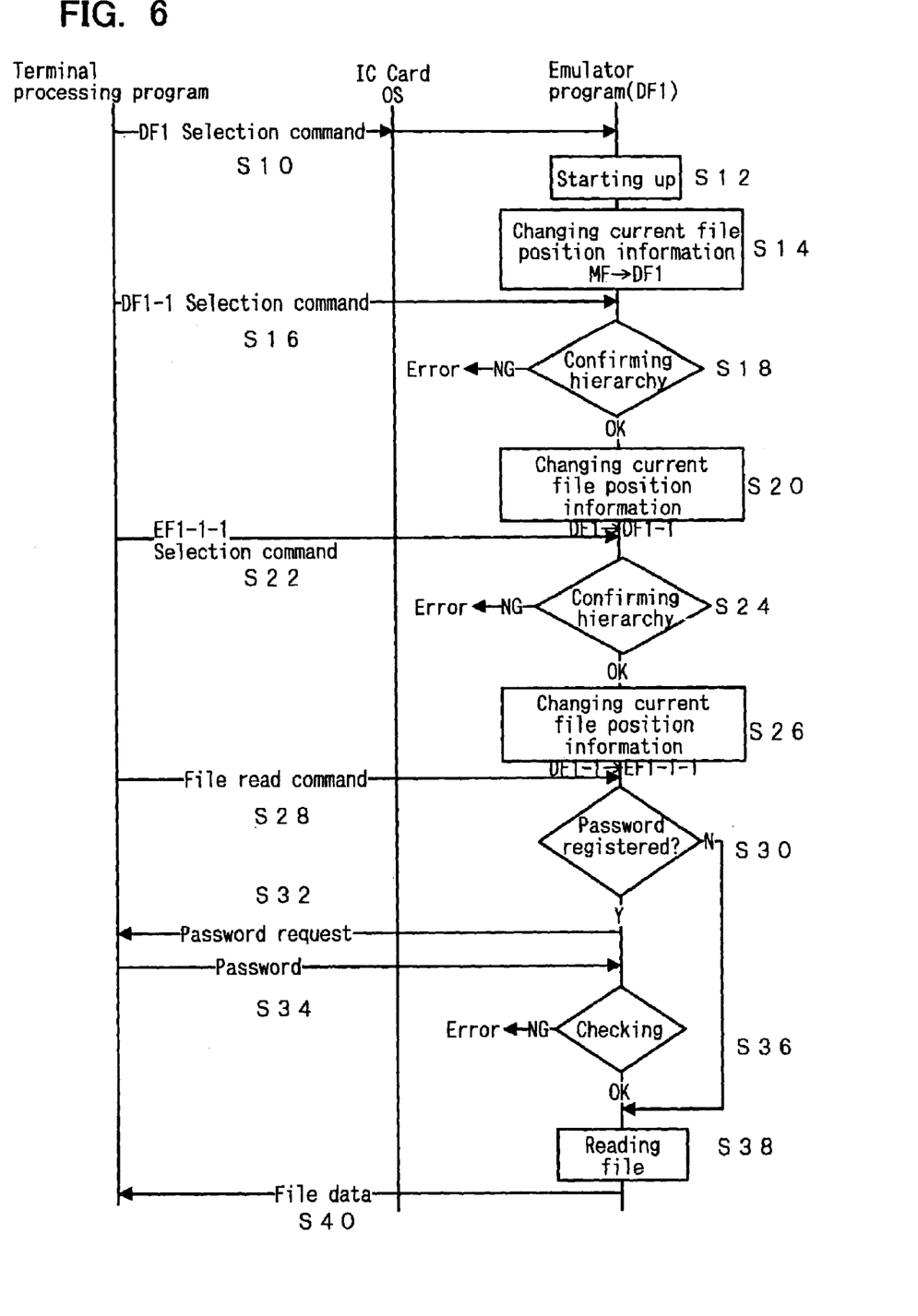
FIG. 6 is an operation flowchart of an emulator program in an embodiment of the present invention.

Each of these kinds of information is explained below together with an explanation of the operation of the emulator program. FIG. 6 is an operation flowchart of an emulator program in an embodiment of the present invention. In FIG. 6, an external terminal for a file system type IC card, sends a DF1 selection command (S10), for example.

The IC card OS receives the DF1 selection command and starts up the emulator program within DF1 (S12). The external terminal is not aware that DF1 is an emulator program here and sends the DF1 selection command as an access command to the file DF1 in FIG. 1 (*a*). On the other hand, because the IC card has the file structure of FIG. 1 (*b*), the IC card OS selects the file DF1 based on the DF1 selection command, and the emulator program within file DF1 starts up. After startup, the emulator program within DF1 changes the current file position information from the ME to DF1 (S14). The initial information for the current file position information of each emulator program is the MF, and when the emulator program starts up, it changes the current file position information to the name of the DF that is storing the emulator program. The IC card OS and emulator program respond to the command from the external terminal.

Next, the external terminal sends a DF1-1 selection command (S16). After an emulator program has started up, it processes commands from the external terminal. Receiving the DF1-1 selection command, the emulator program references the file hierarchy information to confirm whether or not DF1-1 is a file subordinate to DF1 (S18). If DF1-1 is subordinate to DF1, the emulator program changes the current file position information from DF1 to DF1-1 (S20). Otherwise, it responds with an error.

The external terminal then sends an EF1-1-1 selection command (S22). The emulator program references the file hierarchy information in a similar manner as before to confirm whether or not the selected file is subordinate to the file designated in the current file position information (S24). If EF1-1-1 is subordinate to DF1-1, the emulator program changes the current file position information from DF1-1 to EF1-1-1 (S26). Otherwise, the emulator program responds with an error.

After file data EF1-1-1 has been selected, the external terminal sends a file read command (S28). Receiving the file read command, the emulator program references the file attribute information to confirm whether security information (such as a password) has been registered for the file corresponding to the file name designated in the current file position information (in this case, EF1-1-1) (S30).

If a password has been registered, the emulator program sends a password request to the external terminal (S32). The external terminal sends the password that was entered from an input device such as a ten-key pad (S34). The emulator program compares the received password with the password that is registered in the file attribute information (S36). If the passwords match, the emulator program reads the file designated in the current file position information from the file data (S38) and sends it to the external terminal (S40). If the passwords do not match, the emulator program responds with an error. If no password has been registered, the emulator program reads the file designated in the current file position information from the file data and sends the same to the external terminal without performing any password verification.

To read the file designated in the current file position information from the file data, the emulator program references the file address information to obtain the addresses of the file designated in the current file position information within the file data and then reads the file stored in the area corresponding to the addresses that were obtained.

Emulator programs that can process commands from an external terminal for a file system type IC card are installed on a multi-application type IC card in this way, and an external terminal for a file system type IC card is thereby enabled to access the multi-application type IC card. In other words, a multi-application type IC card can be accessed by both an external terminal for multi-application type IC cards and an external terminal for file system type IC cards.

Figure 7:
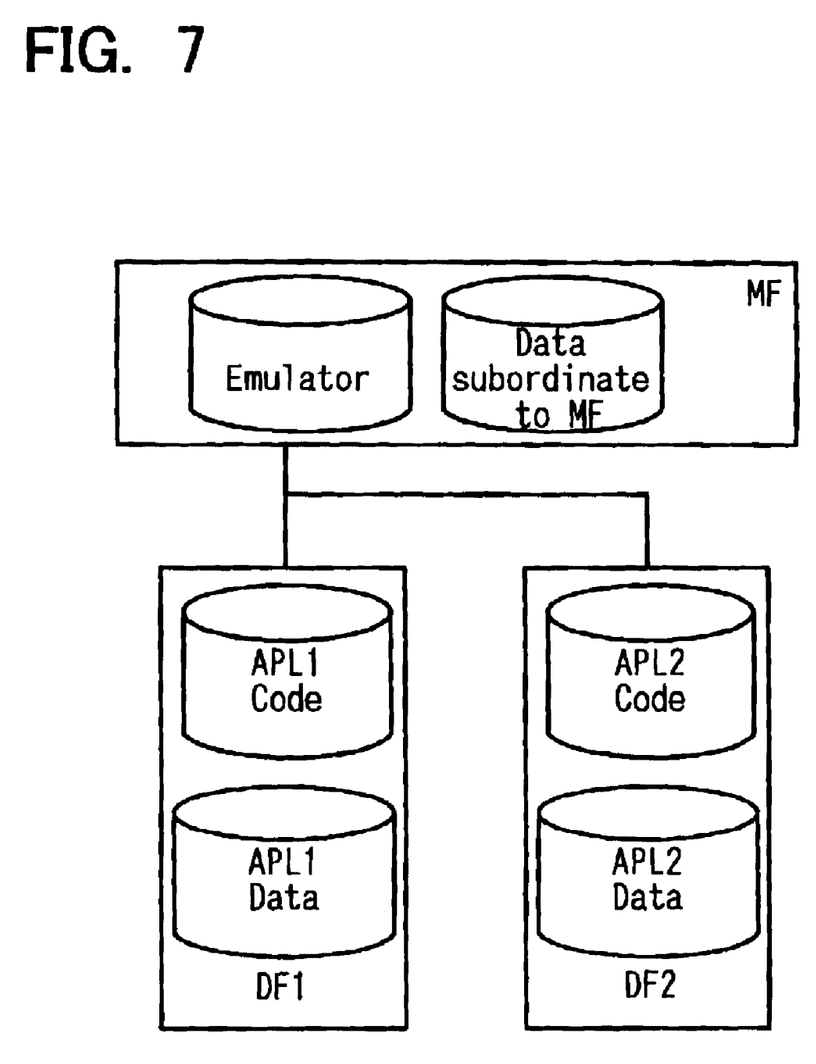
FIG. 7 is a diagram showing another example of a multi-application type file structure containing an emulator program.

FIG. 7 is a diagram showing another example of a multi-application type file structure containing an emulator program. In FIG. 7, a single emulator program is stored within the MF. For example, with an IC card that uses MULTOS, which is one of the IC card standards, there is a special mode called shell mode in which an application program is installed in the MF, and the application program within the MF processes all commands. Using this shell mode and executing the emulation program within the MF enables commands from an external terminal for a file system type IC card to be processed in a similar manner as described above. In the abovementioned embodiment of FIG. 1, individual emulator programs are prepared for each DF subordinate to the MF, but in FIG. 7, a single emulator program for processing all file access commands is prepared in the MF.

INDUSTRIAL APPLICABILITY

As explained above, according to the present invention, emulator programs that can process commands from an external terminal for a file system type IC card are installed on a multi-application type IC card, and an external terminal for a file system type IC card is thereby enabled to access the multi-application type IC card.

The scope of protection of the present invention extends to the inventions that are claimed in the claims and equivalents thereof, and is not limited by the abovementioned embodiment.

What is claimed is:

1. An IC card comprising:

a memory for storing programs corresponding to a first file structure; and a CPU for executing said programs and for communicating with a first external terminal that sends commands corresponding to said programs, wherein said programs include an emulator program for processing commands from a second external terminal that corresponds to another IC card containing files corresponding to a second file structure different from said first file structure, and said CPU executes said emulator program to communicate with said second external terminal.

2. The IC card according to claim 1, wherein said first file structure is a structure having files that contain application programs subordinate to a master file, and said IC card having said first file structure processes commands from said first external terminal according to an application program of a file that is selected according to a selection command from said first external terminal; and said second file structure is a structure having a hierarchy of files that contain data.

3. The IC card according to claim 2, wherein said emulator program has information related to a plurality of files constituting said second file structure and to the hierarchical relationships among that plurality of files; and said emulator program confirms the hierarchical relationships of files that are sequentially selected according to selection commands from said second external terminal based on said information, and accesses a file that is being selected according to an access command from said external terminal.

* * * * *